United States Patent [19]
Raven

[11] 3,886,038
[45] May 27, 1975

[54] NUCLEAR REACTOR FUEL ELEMENT ASSEMBLIES

[75] Inventor: Leonard Fredrick Raven, Crewe, England

[73] Assignee: British Nuclear Fuels Limited, Lancashire, England

[22] Filed: Jan. 15, 1973

[21] Appl. No.: 323,897

[30] Foreign Application Priority Data
Jan. 13, 1972 United Kingdom............... 1758/72
Aug. 1, 1972 United Kingdom............. 35919/72

[52] U.S. Cl.................................. 176/78; 176/81
[51] Int. Cl............................................. G21c 3/34
[58] Field of Search................................ 176/78, 81

[56] References Cited
UNITED STATES PATENTS
3,379,619  4/1968  Andrews et al...................... 176/78
3,395,077  7/1968  Tong et al........................... 176/81
3,442,763  5/1969  Chetter et al....................... 176/78
3,510,397  5/1970  Zettervall........................... 176/78

*Primary Examiner*—Harvey E. Behrend
*Attorney, Agent, or Firm*—Larson, Taylor and Hinds

[57] ABSTRACT

A spacer grid for a nuclear fuel element comprises a plurality of cojointed cylindrical ferrules adapted to receive a nuclear fuel pin. Each ferrule has a pair of circumferentially spaced rigid stop members extending inside the ferrule and a spring locating member attached to the ferrule and also extending from the ferrule wall inwardly thereof at such a circumferential spacing relative to the rigid stop members that the line of action of the spring locating member passes in opposition to and between the rigid stop members which lie in the same diametric plane. At least some of the cylindrical ferrules have one rim shaped to promote turbulence in fluid flowing through the grid.

2 Claims, 13 Drawing Figures

PATENTED MAY 27 1975　　3,886,038

SHEET 1

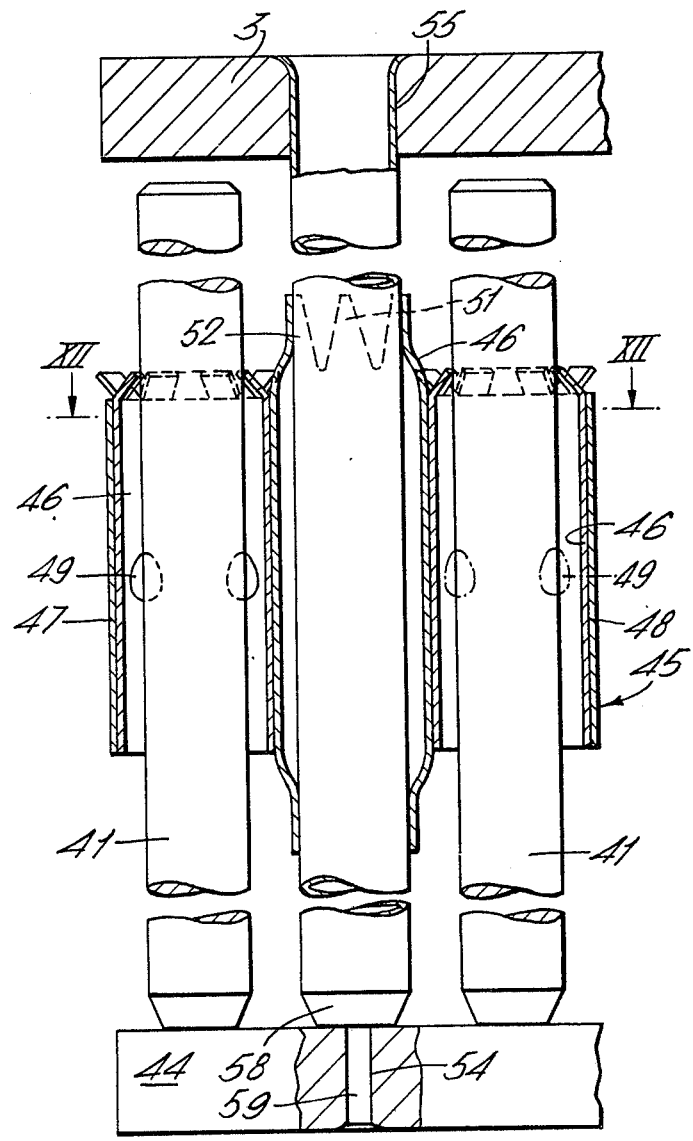

NUCLEAR REACTOR FUEL ELEMENT ASSEMBLIES

This invention relates to nuclear reactor fuel element assemblies of the type comprising a plurality of elongate fuel pins which are arranged parallel to one another in a bundle. The invention also relates to spacer grids which are grid-like structures providing a pattern of fixed spaces through which the fuel pins extend and are thereby spaced from one another.

According to the present invention a spacer grid for a nuclear fuel element comprises a plurality of cojointed cylindrical ferrules adapted to receive a nuclear fuel pin and each ferrule having a pair of circumferentially spaced rigid stop members extending inside the ferrule and a spring locating member attached to the ferrule and also extending from the ferrule wall inwardly thereof at such a circumferential spacing relative to the rigid stop members that the line of action of the spring locating member passes in opposition to and between the rigid stop members which lie in the same diametric plane, and in which at least some of the cylindrical ferrules have one rim shaped to promote turbulence in fluid flowing through the grid.

The plurality of cojointed cylindrical ferrules are preferably joined by welding or brazing at their lines of contact to form a polygonal array of ferrules which can be bounded in part by side plates without the need for a peripheral band.

In such as assembly of ferrules, the spring locating members in some adjacent pairs of ferrules may be conveniently formed by double bow springs which may extend wholly within the ferrule or may have parts protruding from the ferrule ends. In the latter case the bow springs may be looped over the ferrules at their lines of jointing. Midway along this line the ferrules may be inwardly dimpled to form a fixed back stop, limiting the deflection of the bow spring. Alternatively, a double bow spring or a double cantelever spring may be attached to slotted portions of the ferrules and in each case the spring acts in a sense towards, but extending between, a pair of co-planar fixed stops. In all cases, the line of action of the spring locating member lies within the ferrule.

Enhancement of the heat transfer between coolant flowing over nuclear fuel pins, spaced by the ferrules, and the fuel is achieved by forming turbulence promoting tabs on the rims of the ferrules on the outgoing side of the grid and the effect of these tabs is augmented by deflectors located on the rims of the ferrules on the upstream side of the grid, effective to deflect coolant to flow preferentially through the ferrules rather than through gaps between the ferrules. Deflectors, which may lie at an angle of between 45° and 90° to the ferrule axis, also serve as a means of adjusting the overall pressure drop in coolant passing through the grid by selecting the angle the deflectors present to incident flow.

Embodiments of the invention will now be described by way of example with reference to the accompanying drawing in which FIG. 1 is an isometric view of one form of spacer grid FIG. 2 is a longitudinal section along the line II—II of FIG. 1

Figure 2:
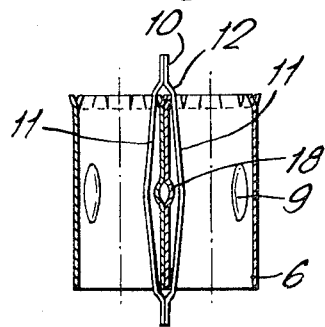
Figure 4:
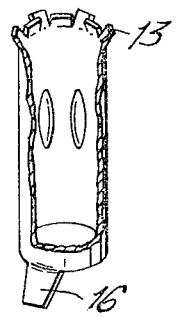
FIG. 4 is a detail of a ferrule of the assembly shown in FIG. 1
Figure 5:
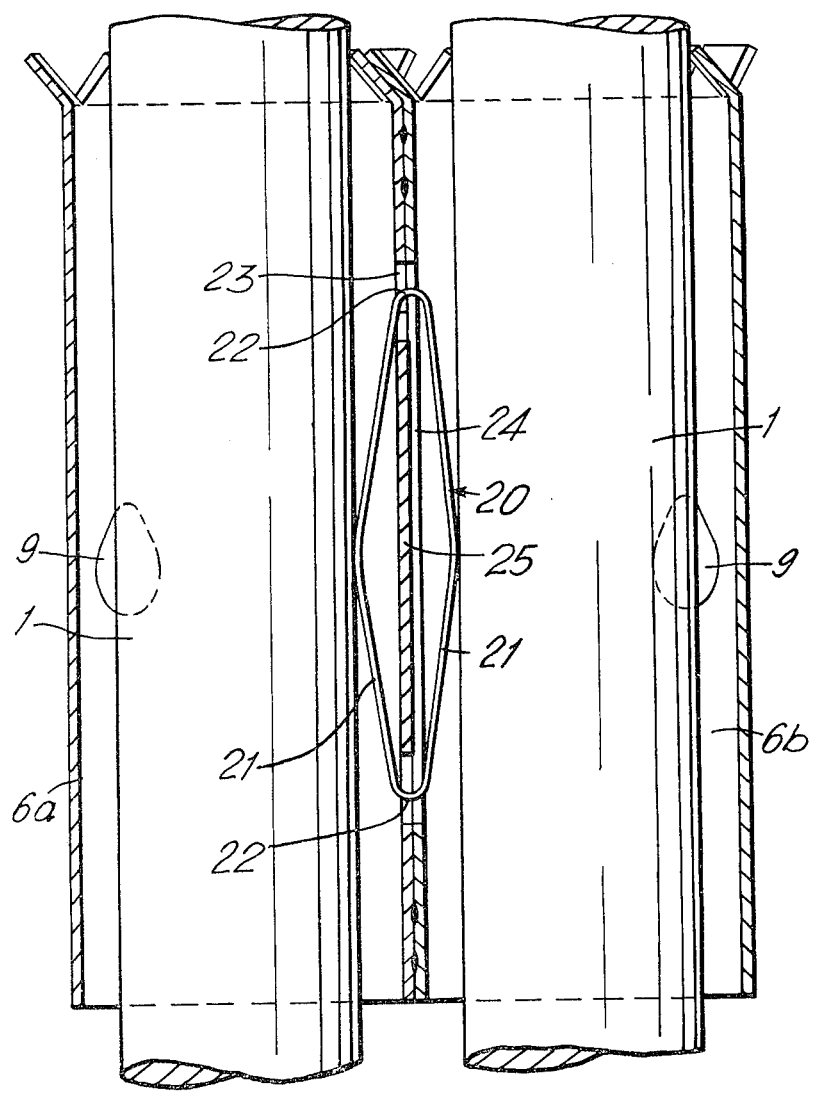
Figure 6:
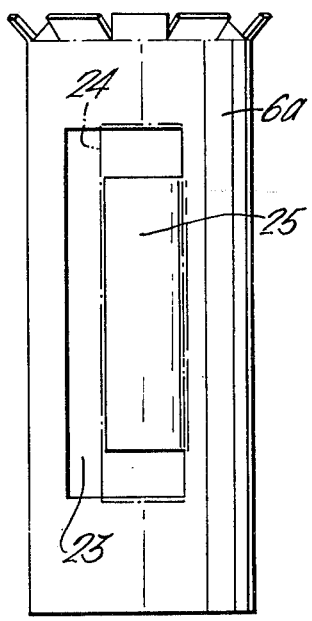
Figure 7:
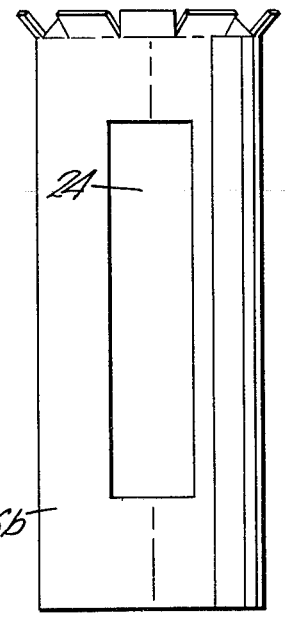
Figure 9:
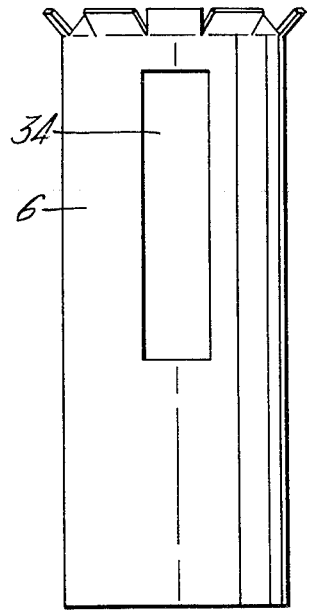
Figure 8:
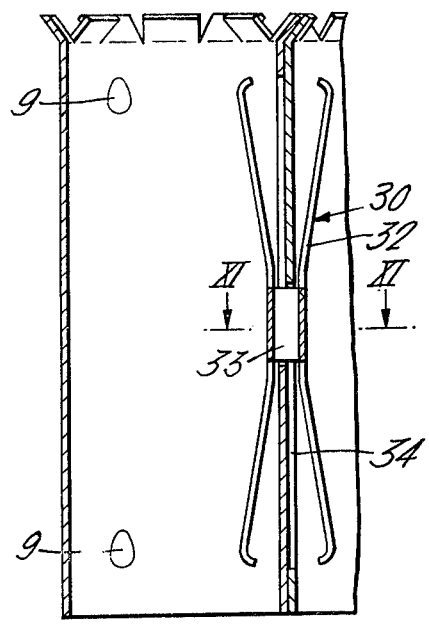
Figure 10:
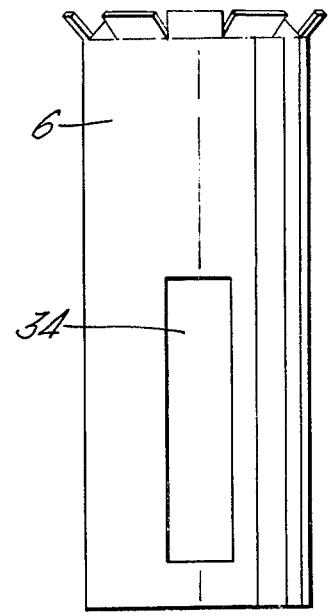
Figure 11:
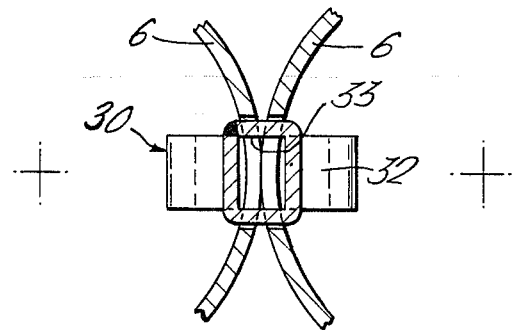
Figure 12:
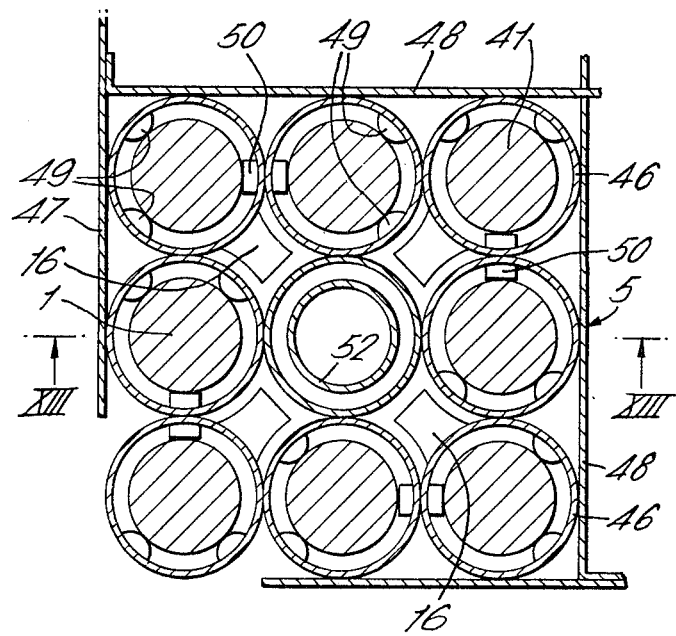

FIG. 5 is a longitudinal cross-section through a pair of cojointed ferrules similar to the view on FIG. 2 but of an alternative construction FIGS. 6 and 7 are views on elevation of the ferrules of FIG. 5 separated from one another FIG. 8 is a longitudinal cross-section of an alternative pair of cojointed ferrules shown separated in FIGS. 9 and 10, FIG. 11 is a cross-section on the line XI XI of FIG. 8 and FIGS. 12 and 13 show respectively cross secti views on lines XII-XII in FIG. 13 and XIII-XIII in FIG. 12 showing part of a typical fuel element.

Figure 1:
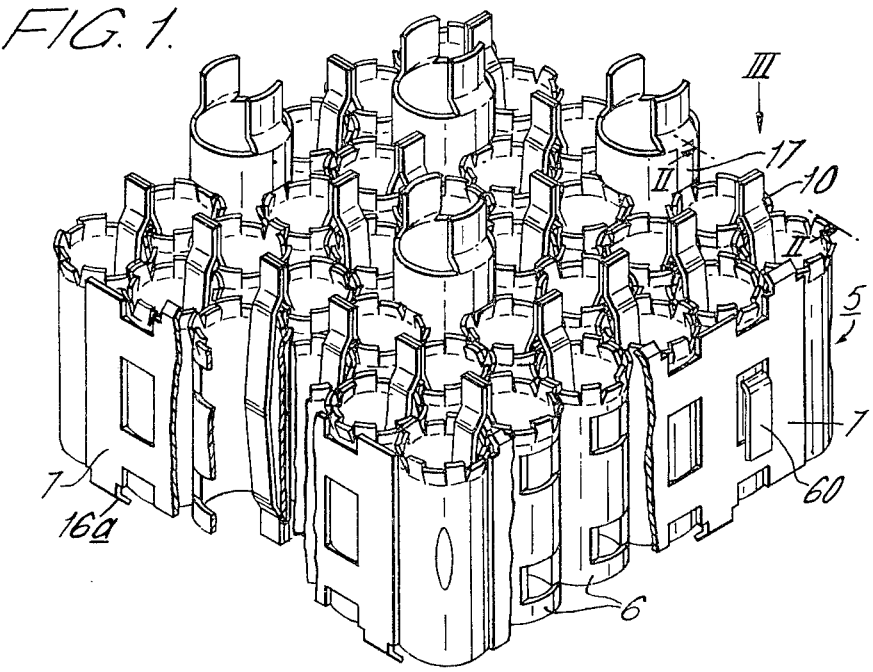
Figure 3:
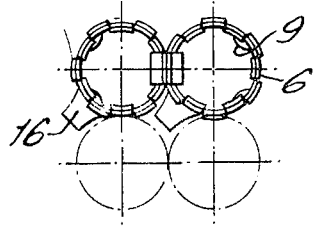
FIG. 3 is a plan view in the direction of the arrow III in FIG. 1

Referring to FIGS. 1, 2 and 3 there is shown part of a spacer grid 5 for a nuclear reactor fuel assembly. The spacer grid 5 comprises an assembly of cojoined tubular ferrules 6. The ferrules are arranged in a square array and side plates 7 are fixed along each of the four sides. The ferrules 6 and the side plates 7 are made, for example, from a material such as Zircaloy and the structure is joined by welding or brazing between the points of contact of the ferrules 6 and between the ferrules and the side plates 7. The outer ferrules may be slotted to accept the plates. In use, a fuel pin extends through each ferrule 6, being held laterally against rigid stop members 9 extending inside the ferrule 6, by a spring locating member 10 made of Inconel or similar high strength spring material. There are in this example two stop members 9 formed inside each ferrule 6, the members 9 being of aerodynamic shape with reference to fluid flow axially through the ferrule. The members 9 may be formed by indenting the side wall of the ferrule inwardly. Alternatively there may be a larger number of fixed stops.

The spring locating members 10 are of composite form each providing for location of the fuel pins of two adjacent ferrules 6 in the assembly. The spring locating members 10 each comprise two bow springs 11 which are joined at their ends by arched end parts 12 fitting over the ferrules 6. Flats (not shown) may be provided on the rims of the ferrules to facilitate positioning of the springs 11. Fixed stops 18 are provided on the ferrules behind the springs 11, formed in this example by pressing dimples midway along adjacent ferrules at their line of contact.

The stop 18 limits the outward deflection of the spring locating members 10 whose line of action extends radially inwards towards the longitudinal axis of the ferrule whilst its position in the ferrule relative to the stop member 9 is such that it extends between these stop members and a fuel pin may be thus held between the rigid stop members and the spring locating member, substantially centrally. Thus, in use, coolant may flow axially over the fuel pin and pass through the spacer grid within which some coolant passes through the ferrules and some between them.

Heat exchange between coolant and fuel pins is enhanced firstly by providing a deflector tab 16 on the coolant entry sides of alternate ferrules 6 to encourage flow into the ferrule in preference to flow through the gaps between ferrules and secondly by incorporating tabs 13 on the rim of each ferrule at the coolant outlet side to promote tubulence in the flowing coolant. Although the tabs 16 and 13 each individually favourably influence heat exchange, their use in combination gives a cumulative effect.

Preferably the deflector tabs 16 are arranged to lie in a plane which intersects the ferrule axis at 45°. Similar deflector tabs 16a are provided on the side plates 7. The turbulence tabs 13 are shown here as castellations around the rim of the ferrule formed by making spaced axial cuts in the rim and bending the sheet material between the each adjacent pair of cuts alternatively inwardly and outwardly. The tabs 13 produce vortices thereby providing fluid mixing and promote the stripping of bubbles from fuel pins in the ferrules. Hence the thermal performance of the fuel element is increased.

A number of special ferrules 17 in each spacer grid 5 provide for location of the spacer grids in relation to zircaloy guide tubes (not shown), which extend longitudinally between upper and lower end fittings of the whole fuel element assembly. The guide tubes 17 may interfere with the pairing of the spring locating members and in such cases a single spring may be provided.

With the arrangement of spring locating member 10 described, the spacer grid can be assembled — by brazing, if required — and checked before the springs are fitted. When assembly of the ferrules 6 is complete, the springs 11 with one end 12 welded are fitted over the ferrules and welded at the other end. In an alternative arrangement, the spring locating members are formed from one piece by bending to form one end, and welding the other. In either case, the springs are arranged to engage the ferrules only at the rims.

In a further embodiment of the invention, shown in FIGS. 5, 6 and 7, the same system of turbulence promoting tabs are provided but the spring locating member is positioned wholly within the pair of the adjacent ferrules.

The spring locating members 20 are of composite form each providing for location of the fuel pins 1 of two adjacent ferrules 6 in the assembly. Referring to FIG. 5 it will be seen that the spring locating members 20 each comprise two bow springs 21 which are jointed at their ends by arched end parts 22. One ferrule 6a of each pair has a longitudinal slot 23 and the other ferrule 6b of the pair has a corresponding longitudinal slot 24. As shown in FIG. 6 the slot 23 in the one ferrule 6a of the pair is of greater width than the slot 24 in the other ferrule 6b. A tongue member 25 extends from one longitudinal edge of the slot 23 in the one ferrule 6a towards the other longitudinal edge of the slot 23. The tongue member 25 is of the same width as the width of the slot 24 in the other ferrule 6b and a gap exists between the longitudinal edge of tongue member 25 and the opposite longitudinal edge of the slot 23. As shown by the dotted outline in FIG. 6 the slot 24 in the ferrule 6b overlies the slot 23 in the ferrule 6a so that the tongue member 25 lies in the slot 24 of the ferrule 6b. The spring locating member 20 fits about the tongue member 25 with the end connecting parts 22 of the spring locating member 20 extending through the corresponding open ends of the slots 23 and 24 in the ferrules 6a and 6b. The spring locating member 20 is assembled with each associated pair of ferrules 6a and 6b by first slipping the spring locating member 20 onto the tongue member 25 in the ferrule 6a through the gap between the edge of the tongue member 25 and the edge of the slot 23 in the ferrule 6a. The ferrule 6a is then brazed or welded to the ferrule 6b with the tongue member 25 fitting in the slot 24 in the ferrule 6b thus trapping the spring locating member 20 between the ferrules 6a and 6b in the position shown in FIG. 5. Otherwise the fuel spacer grid of FIGS. 5–7 is similar to that described with reference to FIGS. 1–4. The rigid stop members 9 are shaped to minimise restriction to flow of coolant over the fuel pins 1 through the ferrules 6. One ferrule 6 of each pair of ferrules has a deflector 16 formed on the coolant entry side of the ferrule 6 to encourage coolant flow into the ferrules 6 in preference to the coolant flowing through the gaps between the ferrules 6. The deflectors 16 are preferably arranged at 45° to the longitudinal axis of the ferrules 6. The top edge of the ferrules are casellated or corrugated to produce vortices thereby providing fluid mixing and hence increasing the thermal performance of the fuel element.

FIG. 8 shows an alternative form of spring locating member 30 which comprises two double cantilever springs 32 connected by a centre bridge piece 33. As shown in FIGS. 7 and 10 the two ferrules 6 of each pair have longitudinal slots 34. When the pair of ferrules 6 are joined together the inner ends of the slots 34 overlap to leave a centre opening which houses the centre bridge piece 33 of the spring locating member 30. The slots 34 in the ferrules 6 are made of sufficient length for insertion of the cantilever springs 32 of the spring locating member 30 through the slots 34 during assembly of the spring locating member 30 with the ferrules 6.

It is to be noted in the above described embodiments, that the use of individual cylindrical ferrules with cylindrical fuel pins ensures generally a uniform flow area for coolant around each pin where the pin passses through the grid. In this uniform flow, the full benefit of turbulence promoting tabs and upstream flow deflectors is best exploited.

FIG. 11 shows that both springs and bridge piece are formed from a single strip of metal. The bridge piece being folded into a box formation and engaged by lower edge of one slot and the upper edge of the other. The construction also allows of the whole grid to be made from zircalloy, the spring locating members being of high strength nickel alloy.

As an alternative to the use of side plates 7, angle plates may be used which may carry on their outside faces raised projections which act as spacers to space the fuel assembly from adjacent assemblies. The side plates 7, or angle plates, may have outstanding loops of plate material in which one limb of a double bow spring may be located to hold the spring with its other limb projecting outwardly to engage the adjacent structural member which forms the wall of the coolant channel. One such spring is shown for example at 60 in FIG. 1.

Referring to FIGS. 12 and 13 there is shown part of a nuclear reactor fuel element assembly comprising a plurality of cylindrical fuel pins 41 which are arranged parallel to one another in a bundle. The fuel pins 41 are located and spaced apart at intervals along their length in the bundle by spacer grids 45, one of which is shown in part in FIGS. 12 and 13. Each spacer grid 45 comprises an assembly of cojoined tubular ferrules 46 with side plates 47 and transverse stiffening webs 48. The ferrules 46, the side plates 47 and the stiffening webs 48 are made, for example, from a material such as Zircaloy and the structure is joined by welding or brazing between the points of contact of the ferrules 46, the plate 47 and the stiffening webs 48. Each fuel pin 41 extends through a ferrule 46, being held laterally against rigid stop members 49 extending inside the ferrule 46, by a spring locating member 50 made of Inconel or similar high strength spring material. There are two stop members 49 formed inside each ferrule 46 arranged in circumferentially spaced positions. The spring locating members 50 are of composite form as shown in FIG. 5 and each provide for location of the fuel pins 41 of two adjacent ferrules 46 in the assembly.

A number of ferrules 46 in each spacer grid 45 provide for location of the spacer grids with zircaloy guide tubes 52 which extend longitudinally between upper and lower end fittings 43 and 44 in the fuel element assembly. As shown in FIG. 13 such guide tube ferrules 46 are provided with tabs 51 at each end to fit about the guide tubes 52. The tabs 51 are brazed or welded to the guide tubes 52. The guide tubes 52 have a zircaloy end cap 58 at their lower end, the end cap 58 being tapped and fitted with a stainless steel spigot 59 which is fitted and spot welded in a drilling 54 in the bottom end fitting 44. At their upper ends the guide tubes 52 are swaged into apertures 55 in the top end fitting 43. The guide tubes 52 may interfere with the pairing of the spring locating members and in such cases a single spring is provided.

What we claim is:

1. A spacer grid for spacing apart a plurality of cylindrical nuclear fuel pins in a stream of coolant flowed over the surface of said pins parallel to the axis thereof, the grid comprising a plurality of cojointed, open ended, cylindrical ferrules, each ferrule having one rim defining part of the downstream face of the grid and its other rim defining part of the upstream face of the grid, positioning means for each ferrule positioning a fuel pin in spaced relation to the inner face of the ferrule said means including a pair of circumferentially spaced, co-planar rigid stop members extending inwardly from the inner face of the ferrule and a spring member also extending inwardly from the inner face of the ferrule with the line of action of the spring member being opposite to and extending between the stop members to urge a fuel pin into engagement with the rigid stop members, said spring member serving to position a fuel pin so that an annular clearance is defined between the pin and the inner wall of the ferrule whereby substantially uniform heat exchange between the fuel pin and the coolant may occur around the part of the circumference of the fuel pin lying within the grid, the said one rim of at least some ferrules being shaped to promote turbulence in the coolant leaving the downstream side of the grid and deflectors for deflecting coolant preferentially into the ferrules located on said other rim of the ferrules defining the upstream edge of the grid.

2. A spacer grid as claimed in claim 1 in which the deflector is a metal tab extending the rim of the ferrule at an angle of between 45° and 90° to the ferrule axis.

* * * * *